US010150903B2

(12) United States Patent
Lin et al.

(10) Patent No.: US 10,150,903 B2
(45) Date of Patent: Dec. 11, 2018

(54) COMPOSITION AND USE THEROF, OIL-BASED DRILLING FLUID AND A METHOD FOR RAISING SHEARING FORCE OF OIL-BASED DRILLING FLUID

(71) Applicants: China Petroleum & Chemical Corporation, Beijing (CN); SINOPEC Research Inst. of Petroleum Engineering, Beijing (CN)

(72) Inventors: Yongxue Lin, Beijing (CN); Xianguang Wang, Beijing (CN); Zhoujun Li, Beijing (CN); Xiuzhen Han, Beijing (CN); Sheng Li, Beijing (CN); Xiaohua Yang, Beijing (CN); Xiong Li, Beijing (CN); Jianwu Zhen, Beijing (CN); Suli Zhao, Beijing (CN)

(73) Assignees: CHINA PETROLEUM & CHEMICAL CORPORATION, Beijing (CN); SINOPEC RESEARCH INSTITUTE OF PETROLEUM ENGINEERING, Beijing (CN)

( * ) Notice: Subject to any disclaimer, the term of this patent is extended or adjusted under 35 U.S.C. 154(b) by 113 days.

(21) Appl. No.: 15/203,007

(22) Filed: Jul. 6, 2016

(65) Prior Publication Data

US 2017/0009121 A1 Jan. 12, 2017

(30) Foreign Application Priority Data

Jul. 7, 2015 (CN) .......................... 2015 1 0395461

(51) Int. Cl.
*C09K 8/035* (2006.01)
*C09K 8/36* (2006.01)
*C09K 8/32* (2006.01)

(52) U.S. Cl.
CPC ................ *C09K 8/035* (2013.01); *C09K 8/32* (2013.01)

(58) Field of Classification Search
None
See application file for complete search history.

(56) References Cited

U.S. PATENT DOCUMENTS

| 2008/0188626 | A1 | 8/2008 | Verghese et al. |
| 2010/0076145 | A1* | 3/2010 | Bobsein .................. C09D 7/43 524/505 |
| 2012/0305250 | A1* | 12/2012 | Burts, Jr. ................ C04B 26/28 166/292 |
| 2014/0378617 | A1 | 12/2014 | Wilson et al. |
| 2016/0022877 | A1 | 1/2016 | Gravesen et al. |

FOREIGN PATENT DOCUMENTS

| CA | 2 852 104 A1 | 5/2013 |
| CN | 101215461 A | 7/2008 |
| CN | 101676332 A | 3/2010 |
| CN | 103666414 A | 3/2014 |
| CN | 105111392 A | 12/2015 |
| CN | 105349118 A | 2/2016 |
| EP | 2 166 043 A2 | 3/2010 |
| EP | 2 316 498 A1 | 5/2011 |
| WO | WO 2006/052730 A1 | 5/2006 |

OTHER PUBLICATIONS

Liu et al., *Research and Property Evaluation of New Flow Pattern Regulator for Oil-Based Drilling Fluid*, Proceedings of the Symposium on Drilling Fluid and Completion Fluid Technologies, 2011, pp. 159-164, and an English abstract.

Office Action dated Aug. 28, 2018, by the State Intellectual Property Office of People's Republic of China in corresponding Chinese Patent Application No. 201610444345.5 with a Search Report and an English translation of the Office Action and Search Report. (18 pages).

* cited by examiner

*Primary Examiner* — Jeffrey D Washville

(74) *Attorney, Agent, or Firm* — Buchanan Ingersoll & Rooney PC

(57) ABSTRACT

A composition and use thereof are disclosed herein. The composition comprises at least two selected from the group of amphiphilic block copolymer, polyurethane and acidic ionic compound. Also an oil-based drilling fluid comprising the composition and a method improving shearing force of oil-based drilling fluid are disclosed. The composition disclosed herewith can raise the shearing force of oil-based drilling fluid.

17 Claims, No Drawings

COMPOSITION AND USE THEROF, OIL-BASED DRILLING FLUID AND A METHOD FOR RAISING SHEARING FORCE OF OIL-BASED DRILLING FLUID

CROSS REFERENCE TO RELATED APPLICATIONS

This application claims priority to Chinese Application No. 201510395461.8, filed on Jul. 7, 2015, entitled "A Flow Pattern Regulator and Use thereof for Oil-Based Drilling Fluid", which is specifically and entirely incorporated by reference.

FIELD OF THE INVENTION

The present invention relates to the field of oil-based drilling fluid of petroleum drilling, particularly to a composition that may be used as a flow pattern regulator of oil-based drilling fluid as well as its use in oil-based drilling fluid and oil-based drilling fluid comprising this composition as well as a method for raising shearing force of oil-based drilling fluid.

BACKGROUND OF THE INVENTION

Shale gas and other unconventional energies universally adopt long distance horizontal drilling technology to raise drilling efficiency. As oil-based drilling fluid has strong inhibitive ability and outstanding lubricity and is conducive to borehole stability, it is widely applied in the drilling process of extended reach wells and horizontal wells.

Oil-based drilling fluid is a drilling fluid system using oil as a continuous phase and brine as a dispersion phase and formed by adding emulsifier, organic clay and oleophilic colloid. In oil-based drilling fluid, because organic clay can hardly form a strong matrix structure as bentonite does in water-based drilling fluid, the suspension stability is usually poor, leading to difficulty in carrying rock cuttings out of borehole in extended reach sections and horizontal sections.

At present, in China, organic clay and oleophylic colloid are mainly used as tackifier and shear strength-improving agent of oil-based drilling fluid to raise the yield point of drilling fluid, but as the shear strength-improving effect is poor, a large amount of organic clay and/or oleophylic colloid need to be added. As a result, oil-based drilling fluid system is more likely to suffer from thickening problems after aging or circulating at high temperature as well as worsening of theological properties. The above problems are more prominent in high-density oil-based drilling fluid, including diesel-based and mineral oil-based drilling fluid.

SUMMARY OF THE INVENTION

In order to solve the above problems of prior art, the present invention provides a composition as well as its use and oil-based drilling fluid comprising this composition as well as a method for raising shearing force of oil-based drilling fluid. Using the composition provided by the present invention as a flow pattern regulator in oil-based drilling fluid can raise yield point under the condition of not significantly increasing viscosity, improve the theological properties and solid-phase suspension stability of the system, and assure borehole cleanliness and underground safety of extended reach wells or long horizontal wells.

The first object of the present invention is to provide a composition, comprising at least two selected from the group of amphiphilic block copolymer, polyurethane and acidic ionic compound, The amphiphilic block copolymer has at least one of the structures shown in the following Formula (1), Formula (2) or Formula (3):

      Formula (1)

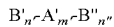      Formula (2)

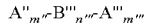      Formula (3)

wherein each of A, A', A" and A''' denotes a hydrophilic repeat unit, and each of B, B', B" and B''' denotes a hydrophobic repeat unit;

m, n, m', n', m", n", m''', n''' are numbers of repeat units, in a range of 5-250, preferably 10-200;

the acidic ionic compound comprises two or more than two acid radical anions, and a least two acid radical anions are at the two ends of the acidic ionic compound respectively.

The second object of the present invention is to provide the use of the foregoing composition in oil-based drilling fluid.

The third object of the present invention is to provide an oil-based drilling fluid comprising the foregoing composition.

The fourth object of the present invention is to provide a method for raising structural strength and shearing force of oil-based drilling fluid. The method includes using the foregoing composition as a flow pattern regulator of oil-based drilling fluid.

When the composition provided by the present invention is used as a flow pattern regulator of drilling fluid, it can greatly raise the yield point of the drilling fluid by realizing coordination of at least two of specific amphiphilic (hydrophilic and lipophilic) block copolymer, polyurethane and specific acidic ionic compound, thereby reducing the dosage level of organic clay and effectively solving the problem of theological property and sand carrying capacity of drilling fluid. The ratio of yield point to plastic viscosity of the drilling fluid comprising the composition provided by the present invention as a flow pattern regulator is about 0.5, much higher than 0.25 in prior art. Compared with conventional tackifier or theology modifier of oil-based drilling fluid, the present invention can raise structural strength and shearing force and improve theological property under the condition of not significantly raising viscosity of drilling fluid and may be applied in diesel-based and mineral oil-based drilling fluid. Moreover, the flow pattern regulator of the present invention may reduce dosage level of organic clay and raise the tolerance of drilling fluid system to low-density solid-phase. The possible reason is that the flow pattern regulator provided by the present invention has multiple hydrophilic and lipophilic active points in molecular structure and can effectively adsorb and enhance the connectivity between organic clay and dispersed droplets, thereby raising overall structural force of the drilling fluid system.

DETAILED DESCRIPTION OF THE EMBODIMENTS

The embodiments of the present invention will be described in details below. It should be understood that the embodiments described here are intended to illustrate and not to limit the present invention. The endpoints and any value of any range disclosed in the present invention are not limited to the ranges or values in this accuracy. These ranges or values should be understood to include values close to these ranges or values. As for numerical ranges, various combinations may be made between endpoint values of each range, or between endpoint value and separate point value of each range, or between separate point values to obtain one or more of new numerical ranges. These numerical ranges shall be deemed to be disclosed in the present invention. In the context below, the technical schemes may be mutually combined in principle to obtain new technical schemes These new technical schemes shall also be deemed to be disclosed in this article.

According to the first aspect of the present invention, the present invention provides a composition, comprising at least two of amphiphilic block copolymer, polyurethane and acidic ionic compound, the amphiphilic block copolymer has at least one of the structures shown in Formula (1), Formula (2) or Formula (3):

$$A_m\text{-}B_n \qquad \text{Formula (1)}$$

$$B'_n\text{-}A'_m\text{-}B''_{n''} \qquad \text{Formula (2)}$$

$$A''_{m'}\text{-}B'''_{n'''}\text{-}A'''_{m'''} \qquad \text{Formula (3)}$$

wherein each of A, A', A" and A'" denotes a hydrophilic repeat unit, and each of B, B', B" and B'" denotes a hydrophobic repeat unit;

m, n, m', n', m", n", m'", n'" are numbers of repeat units, in a range of 5-250, preferably 10-200;

the acidic ionic compound comprises two or more than two acid radical anions, and a least two acid radical anions are at two ends of the acidic ionic compound respectively.

In the present invention, each of A, A', A", A'", B, B', B" and B'" denotes a repeat unit of the polymer respectively, and the chain segment comprising a plurality of same repeat units connected in form of bond is called block.

According to the composition provided by the present invention, the object can be realized as long as there are two or more of the above components in the composition, there may be the following several circumstances:

(1) It comprises amphiphilic block copolymer, polyurethane and acidic ionic compound. in this case, it is preferred that on the basis of the total amount of the composition, the content of the amphiphilic block copolymer is 5-25 wt %, preferably 10-20 wt %, the content of the polyurethane is 55-75 wt %, preferably 60-70 wt %, and the content of acidic ionic compound is 10-25 wt %, preferably 10-20 wt %.

(2) It comprises amphiphilic block copolymer and acidic ionic compound. In this case, it is preferred that on the basis of the total amount: of the composition, the content of the amphiphilic block copolymer is 10-50 wt %, preferably 20-40 wt %, and the content of acidic ionic compound is 50-90 wt %, preferably 60-80 wt %.

(3) It comprises amphiphilic block copolymer and polyurethane. In this case, it is preferred that on the basis of the total amount of the composition, the content of the amphiphilic block copolymer is 10-50 wt %, preferably 20-40 wt %, and the content of polyurethane is 50-90 wt %, preferably 60-80 wt %.

(4) It comprises polyurethane and acidic ionic compound. In this case, it is preferred that on the basis of the total amount of the composition, the content of the polyurethane is 55-95 wt %, preferably 60-90 wt %, and the content of acidic ionic compound is 5-45 wt %, preferably 10-40 wt %.

For a composition, the total amount is 100 wt %.

When other conditions are same, (1)>(2)>(3)>(4) in effect, that means (1) is the best.

According to the composition provided by the present invention, the amphiphilic block copolymer comprises a plurality of foregoing hydrophilic groups and hydrophobic groups. Preferably, there are 0-5 carbon atoms between two adjacent hydrophilic groups.

The hydrophilic group for example may be one or more of $-COOH$, $OH$, $NH_2$ and $CONH_2$. in the present invention, the hydrocarbonyl may be any group only comprising atoms C and H and may be one or more of linear, branched or cyclic alkyl, aryl, alkenyl and alkynyl. Preferably, the number of carbon atoms in the hydrocarbonyl is 2-20, more preferably 2-10, still more preferably 2-5.

According to a preferred embodiment of the present invention, each of A, A', A" and A'" in the amphiphilic block copolymer is one or more of the following Formula (A-1), Formula (A-2) and Formula (A-3);

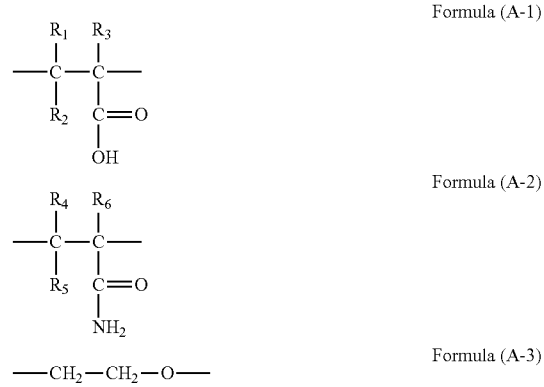

Wherein each of $R_1$, $R_2$, $R_3$, $R_4$, $R_5$ and $R_6$ is independently H or C1-C5 alkyl;

The C1-C5 alkyl for example is methyl, ethyl, propyl, isopropyl, n-butyl, iso-butyl, tert-butyl, n-amyl, isoamyl, and other isomeric forms of C5 alkyl.

The hydrophobic group may be a hydrophobic group with fewer atoms (for example 2-5 atoms , such as an ester group, and may also he a hydrophobic group with more atoms (>5 atoms), such as a hydrophobic residue of a hydrophobic substance comprising the foregoing hydrophobic group with fewer atoms (2-5 atoms) after losing one or more of atoms.

Preferably, B in the amphiphilic block copolymer is hydrocarbonyl, ester or hydrocarbonyl comprising the ester. The hydrocarbonyl may be any group only comprising atoms C and H and may be one or more of linear, branched or cyclic alkyl, aryl, alkenyl, and alkynyl. Preferably, the number of carbon atoms in the hydrocarbonyl is 2-20, more preferably 2-15.

According to a preferred embodiment of the present invention, each of B, B', B" and B'" is one or more of the following Formula (B-1), Formula (B-2) and Formula (B-3);

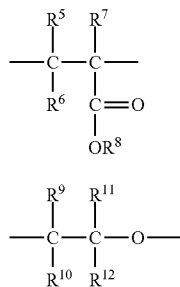

Formula (B-2)

Formula (B-3)

Wherein each of $R^1$, $R^2$, $R^3$, $R^4$, $R^5$, $R^6$, $R^7$, $R^9$, $R^{10}$, $R^{11}$ and $R^{12}$ H or C1-C10 hydrocarbonyl, and at least one of $R^9$, $R^{10}$, $R^{11}$ and $R^{12}$ is not H, and $R^8$ is C1-C10 hydrocarbonyl; preferably, each of $R^1$, $R^2$, $R^3$, $R^4$, $R^5$, $R^6$, $R^7$, $R^9$, $R^{10}$, $R^{11}$ and $R^{12}$ is H, methyl, ethyl, propyl, vinyl, allyl, propenyl, phenyl or tolyl, and at least one of $R^9$, $R^{10}$, $R^{11}$ and $R^{12}$ is not H, and $R^8$ is methyl, ethyl, propyl, vinyl, allyl, propenyl, phenyl or tolyl; more preferably, any of $R^1$, $R^2$, $R^3$, $R^4$, $R^9$, $R^{10}$, $R^{11}$ and $R^{12}$ is methyl, ethyl, propyl, vinyl, propenyl, phenyl or tolyl and each of the rest is H or methyl, each of $R^5$, $R^6$ and $R^7$ is independently H, methyl or ethyl, and $R^8$ is methyl or ethyl; each of m, n, m', n', m", n", m''' and n''' is in a range of 10-250, preferably 10-200, more preferably 20-160, The C1-C10 hydrocarbonyl includes but not limiting methyl, ethyl, propyl, vinyl, allyl, butyl and its isomeric forms, amyl and its isomeric forms, hexyl and its isomeric forms, cyclohexyl, propenyl, phenyl or tolyl; preferably, each of $R^1$, $R^2$, $R^3$, $R^4$, $R^5$, $R^6$, $R^7$, $R^9$, $R^{10}$, $R^{11}$ and $R^{12}$ is independently H, methyl, ethyl, propyl, vinyl, propenyl, phenyl or tolyl, $R^8$ is methyl, ethyl, propyl, vinyl, propenyl, phenyl or tolyl; more preferably, any of $R^1$, $R^2$, $R^3$, $R^4$, $R^9$, $R^{10}$, $R^{11}$ and $R^{12}$ is methyl, ethyl, propyl, vinyl, allyl, propenyl, phenyl or tolyl, and the rest are H or methyl, and each of $R^5$, $R^6$ and $R^7$ is independently H, methyl or ethyl, and $R^8$ is methyl or ethyl. In the present invention, hydrophobic block and hydrophilic block are directly connected in form of bond.

From the perspective of raw material availability, the amphiphilic block copolymer is amphiphilic 2-block and/or 3-block copolymer. Formula (1) shows a 2-block copolymer, and Formula (2) and Formula (3) show 3-block copolymers.

In the present invention, the composition may only comprise one type of amphiphilic block copolymer, or comprise two or more than two types of amphiphilic block copolymers in one molecule. The type of amphiphilic block copolymer is classified by repeat unit. Identical repeat units mean a same type of amphiphilic block copolymer. While amphiphilic block copolymer with different repeat units means different type of amphiphilic block copolymer. In a same type of amphiphilic block copolymer, different molecules may have a same or different length of block. In different amphiphilic block copolymers, the number of same repeat units may be same or different.

According to one embodiment, in the amphiphilic block copolymer, each of A, A', A" and A''' is at least one of acrylic acid structural unit, methacrylic acid structural unit, acrylamide structural unit, methacryl amide structural unit and ethylene oxide structural unit; each of B, B', B" and B''' is at least one of ethylene, propylene, butylene, butadiene, styrene and acrylic ester structural units; each of m, n, m', n', m", n", m''' and n''' is in orange of 10-250, preferably 10-200, more preferably 20-160. Preferably, the lipophilic block of amphiphilic block copolymer is at least one of polyolefin resin, polyacrylate resin and polystyrene resin segments; the hydrophilic block of amphiphilic block copolymer preferably is at least one of polyacrylic acid, polyacrylainide and polyethylene oxide segments. The number of repeat units in each segment of the amphiphilic block copolymer is in a range of 10-200, preferably 20-160.

In the present invention, it is critical to control the number of repeat units in each segment of the amphiphilic block copolymer within the foregoing range. The inventor of the present invention discovered that when the number of repeat units in a segment is less than 20, particularly less than 10, the molecular size is too small to form physical connection between organic clay and dispersed droplet and raise overall structural force of the drilling fluid system. When the number of repeat units in a segment is more than 160, particularly more than 200, more particularly more than 250, the molecular weight is large, the synthesis is difficult, the synthesis cost is high and the solid material is hardly soluble and can hardly be dispersed quickly in the drilling fluid system to form a solution.

According to a preferred embodiment of the present invention, the amphiphilic block copolymer is one or more of polyacrylamide-polystyrene 2-block copolymer, polyethylene glycol-polystyrene 2-block copolymer, polymethacrylamide-polystyrene 2-block copolymer, polyethylene glycol-polymethyl acrylate 2-block copolymer, polyethylene glycol-polymethyl methacrylate 2-block copolymer, polyethylene glycol-polyethyl acrylate 2-block copolymer, polyethylene glycol-polyethyl methacrylate 2-block copolymer, polyacrylamide-polystyrene-polyacrylamide 3-block copolymer, polymethacrylamide-polystyrene-polymethacrylamide 3-block copolymer, polyethylene glycol-polystyrene-polyethylene glycol 3-block copolymer, polyethylene glycol-polymethyl acrylate-polyethylene glycol 3-block copolymer, polyethylene glycol-polymethyl methacrylate-polyethylene 3-block copolymer, polyethylene glycol-polyethyl acrylate-polyethylene glycol 3-block copolymer, polyethylene glycol-polyethyl methacrylate-polyethylene glycol 3-block copolymer, polystyrene-polyacrylic acid-polystyrene 3-block copolymer, polystyrene-polyacrylamide-polystyrene 3-block copolymer, polystyrene-polymethacramide-polystyrene 3-block copolymer, polymethyl acrylate-polyethylene glycol-polymethyl acrylate 3-block copolymer, polymethylinethacrylate-polyethylene glycol-polymethyl methacrylate 3-block copolymer, polyethyl acrylate-polyethylene glycol-polyethyl acrylate3-block copolymer, polyethyl methacrylate-polyethylene glycol-polyethyl methacrylate 3-block copolymer.

The number of repeat units in each segment may be 10-250, preferably 10-200, more preferably 20-160, may also be 15-50 i.e.: each of m, n, m', n', m", n", m''' and n''' may be in the range of 10-250, preferably 10-200, more preferably 20-160, may also be in the range of 15-50.

In order to understand the structure of the foregoing amphiphilic block copolymer in a better way, it is described by taking acrylic acid-styrene 2-block copolymer for example:

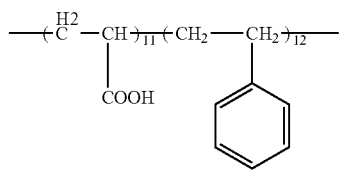

polyacrylic acid-polystyrene
2-block copolymer

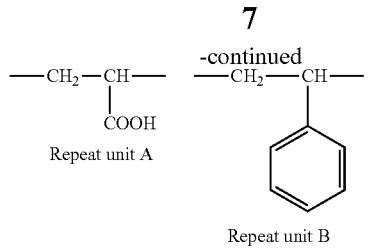

Repeat unit A

—CH₂—CH—
      |
      (phenyl ring)

Repeat unit B

Wherein each of 11 and 12 is in a range of 10-250, preferably 10-200, more preferably 20-160, The block formed by repeat units A and the block formed by repeat units B are connected directly in form of bond.

In the present invention, from the perspective of raising shearing force of drilling fluid, under the precondition of assuring good solubility in oil phase, preferably the larger the number of repeat units in each segment in the foregoing range, the better; the hydrophilic repeat unit preferably is polyacrylamide, and the hydrophobic repeat unit preferably is polystyrene.

The foregoing amphiphilic block copolymer is available in the market and/or is prepared based on the knowledge of those skilled in the art.

In the present invention, the number of the blocks (i.e., the number of repeat units in each segment) m, n, m', n', m", n", m'" and n'" can be calculated by the combination of the number average molecular weight and the composition information of the whole polymer. The number average molecular weight and distribution index of whole polymer are both determined by Size-Exclusion Chromatography (SEC) using ALLIANCE2690 gel permeation chromatograph (GPC) of American WATERS. THF is a mobile phase, narrow distribution polystyrene is a standard sample, and the concentration of the sample is 0.05 wt % and determined at 25° C. The component information of the whole polymer can be calculated from $^1$H-NMR by using AVANCE 300 of Switzerland Bruker and CDCl$_3$ as the solvent. For example, for poly(styrene-b-ethylene oxide) sample P11216A-SEO purchased from Canadian Polymer Source Inc., the number ratio of the two repeat units can be obtained by comparing the peak area of the phenyl polystyrene protons between 6.4 to 7.2 ppm and the ethylene oxide protons at 3.65 ppm. The number average molecular weight of each PS and PEO block can be obtained by above data. The number of blocks can be obtained by dividing the number average molecular weight of each block by molecular mass of the repeat unit. For B'$_{n'}$-A'$_{m'}$-B"$_{n"}$ or A"$_{m"}$-B'"$_{n"}$-A'"$_{m'"}$ 3 blocks copolymer, the two blocks on the two ends are thought to have same repeat unit number. The information of the block copolymer used in the following examples are detected and provided by the Canadian Polymer Source Inc.

According to the composition provided by the present invention, preferably the polyurethane is obtained from reaction between polyethylene glycol and diisocyanate, and the number average molecular weight is in a range of 5000-100000, More preferably, the polyurethane has a structure shown in Formula (1):

(—R—NH—CO—O—R'—O—CO—NH—)$_x$   Formula (I)

Wherein R and R' are linear, branched or cyclic aliphatic series alkylidene, the number of C is in a range of 2-6, and x is 10-200, R and R' specifically may be ethylidene, propylidene, isopropylidene, cyclopropylidene, butylidene, isobutylidene, sec-butylidene, tert-butylidene, amylidene, tert-amylidene, etc. In the present invention, preferably, the polyurethane is polyurethane in form of anionic water-soluble polyurethane prepolymer. The solid content in the emulsion is preferably 40-80 wt %. When the form of prepolymer emulsion is used, the content of polyurethane in the present invention is calculated with solid content in emulsion.

According to the composition provided by the present invention, the acidic ionic compound may comprise two or more than two acid radical anions, and at least two acid radical anions are at the two ends of the acidic ionic compound respectively.

Preferably, the number of carbon atoms in the acidic ionic compound is 2-20, and the acid radical anions is one or more of carboxylate radical, sulfonate radical and aminosulfonate radical.

Preferably, the acidic ionic compound is polybasic carboxylic acid with a structure shown in Formula (II) and/or its alkali metal and/or alkaline-earth metal salts:

COOH—[R$^{13}$—CH(COOH)]$_k$—R$^{14}$—COOH   Formula (11)

R$^{13}$ and R$^{14}$ are both linear alkylidene, the number of C is in a range of 3-18, and k is in a range of 0-2, Specifically, they for example may be one or more of glutaric acid, adipic acid, pimelic acid, octanedioic acid, azelaic acid, sebacic acid, dodecanedioic acid, hexadecanedioic acid, octanedioic acid and 1,2,3-trihexanoic acid as well as one or more of their monovalent or bivalent kali salt, sodium salt, magnesium salt and calcium salt Preferably, the acidic ionic compound is one or more of glutaric acid, adipic acid, &odium adipate, sebacic acid, disodium sebate, dipotassiumsebate, dodecanedioic acid, sodium dodecanedioate, hexadecanedioic acid, sodiumhexadecanedioate, octanedioic acid, sodium octanedioate and potassium octanedioate.

In the present invention, each of the acidic ionic compounds may be used separately, or two or more than two of them may be used in combination. Likewise, each of amphiphilic block copolymers and polyurethane may be used separately or two or more than two of them may be used in the same time. According to an embodiment of the present invention, the present invention provides a flow pattern regulator composition used in oil-based drilling fluid, characterized in that the composition comprises at least two of amphiphilic block copolymer, polyurethane, polybasic acid and polybasic salt.

The lipophilic block of the amphiphilic block copolymer is at least one of polyolefin resin, polyacrylate resin and polystyrene resin. The number of repeat units in each segment is in a range of 10-250, preferably 10-200, more preferably 20-160; the hydrophilic block of amphiphilic block copolymer is at least one of polyacrylic acid, polyacrylamide and polyethylene oxide segments. The number of repeat units in each segment is in a range of 10-250, preferably 10-200, more preferably 20-160.

The foregoing lipophilic block and hydrophilic block form 2- block or 3-block copolymer.

Wherein the number average molecular weight of the polyurethane is in a range of 5000-100000, the distribution index of molecular weight is 1.4-3.0, preferably 2-2.5, and it has a structure shown in Formula (I'):

[COONH—R$^{15}$—]$_p$—[O—CH$_2$CHR$^{16}$]$_q$   Formula (I')

In Formula (I'), R$^{15}$ and R$^{16}$ are linear, branched or cyclic aliphatic series alkylidene, the number of C is in a range of 2-6, and p and q are 10-200, preferably 15-50;

The polybasic acid comprises two or more than two carboxyl groups, which are connected with aliphatic chains; the polybasic acid has a structure shown in Formula (II):

COOH—[R$^{13}$—CH(COOH)]$_k$—R$^{14}$—COOH   Formula (II)

In Formula (II), $R^{13}$ and $R^{14}$ are both linear aliphatic alkylidene, the number of C is in a range of 3-18, and k is in a range of 0-2.

The polybasic salt is obtained from reaction between polybasic acid and alkali metal, and the metal ions in the alkali metal are one or more of $Na^+$, $K^+$, $Ca^{2+}$ and $Mg^{2+}$ ions.

Preferably, the lipophilic block of amphiphilic block copolymer is at least one of polyolefin resin, polyacrylate resin and polystyrene resin segments, and the number of repeat units is in a range of 10-200; the hydrophilic block of amphiphilic block copolymer is at least one of polyacrylic acid, polyacrylatnide and polyethylene oxide segments, and the number of repeat units is in a range of 10-200.

The number average molecular weight of the polyurethane is in a range of 5000-100000, It has a structure shown in Formula (I):

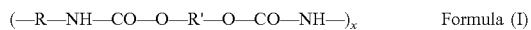

(—R—NH—CO—O—R'—O—CO—NH—)$_x$   Formula (I)

wherein R and R' are linear, branched or cyclic aliphatic alkylidene with 1-6 carbon atoms, and x is 10-200; the polyurethane may be obtained from polymerization of polyester or polyether and diisocyanate compound.

The molecule of the polybasic acid comprises two or more than two carboxyl groups, which are connected with aliphatic chains; the polybasic acid has a structure shown in Formula (II):

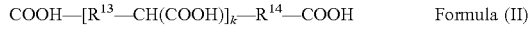

COOH—[$R^{13}$—CH(COOH)]$_k$—$R^{14}$—COOH   Formula (II)

$R^{13}$ and $R^{14}$ are both linear aliphatic alkylidene, the number of C is in a range of 3-18 and k is in a range of 0-2.

The polybasic salt is obtained from reaction between polybasic acid and alkali metal or alkaline earth metal hydroxide. The metal ions in the alkali metal or alkaline earth metal hydroxide are one or more of $Na^+$, $K^+$, $Ca^{2+}$ and $Mg^{2+}$ ions.

According to the composition in a preferred embodiment of the present invention, the amphiphilic block copolymer is one or more of polyacrylamide-polystyrene 2-block copolymer, polyethylene glycol-polystyrene 2-block copolymer, polymethacrylamide-polystyrene 2-block copolymer, polyethylene glycol-polymethyl acrylate 2-block copolymer, polyethylene glycol-polymethyl methacrylate 2-block copolymer, polyethylene glycol-polyethyl acrylate 2-block copolymer, polyethylene glycol-polyethyl methacrylate 2-block copolymer, polyacrylamide-polystyrene-polyacrylamide 3-block copolymer, polymethacrylamide-polystyrene-polymethacrylamide 3-block copolymer, polyethylene glycol-polystyrene-polyethylene glycol 3-block copolymer, polyethylene glycol-polymethyl acrylate-polyethylene glycol 3-block copolymer, polyethylene glycol-polymethyl methacrylate-polyethylene glycol 3-block copolymer, polyethylene glycol-polyethyl acrylate-polyethylene glycol 3-block copolymer, polyethylene glycol-polyethyl methacrylate-polyethylene glycol 3-block copolymer, polystyrene-polyacrylic acid-polystyrene 3-block copolymer, polystyrene-polyacrylamide-polystyrene 3-block copolymer, polystyrene-polymethacrylamide-polystyrene 3-block copolymer, polymethyl acrylate-polyethylene glycol-polymethyl acrylate 3-block copolymer, polymethyl methacrylate-polyethylene glycol-polymethyl methacrylate 3-block copolymer, polyethyl acrylate-polyethylene glycol-polyethyl acrylate 3-block copolymer, and polyethyl methacrylate-polyethylene glycol-polyethyl methacrylate 3-block copolymer; the number of repeat units in each segment (or block) is 10-200;

the polyurethane is obtained from reaction between polyethylene glycol and diisocyanate, the number average molecular weight is 5000-10000, and the distribution index of molecular weight is 1-2.5;

the acidic ionic compound is one or more of glutaric acid, adipic acid, disodium adipate, sebacic acid, disodium sebate, dipotassiumsebate, dodecanedioic acid, sodium dodecanedioate, hexadecanedioic sodiumhexadecanedioate, octanedioic acid, sodium octanedioate and potassium octanedioate.

According to a preferred embodiment of the present invention, when amphiphilic block copolymer and polyurethane are used in a combination, on the basis of the weight of the flow pattern regulator used in the oil-based drilling fluid, the content of the amphiphilic block copolymer is 20-40 wt % and the content of polyurethane is 60-80 wt %; preferably, the content of amphiphilic block copolymer is 30-40 wt %, and the content of polyurethane is 60-70 wt %.

According to a preferred embodiment of the present invention, when amphiphilic block copolymer, polybasic acid and polybasic salt are used in a combination, on the basis of the weight of the flow pattern regulator used in the oil-based drilling fluid, the content of the amphiphilic block copolymer is 20-40 wt %, the content of the polybasic acid or polybasic salt is 60-80 wt %. Preferably, the content of amphiphilic block copolymer is 30-35 wt %, and the content of polybasic acid or polybasic salt is 65-70 wt %.

According to a preferred embodiment of the present invention, when polyurethane and polybasic acid or polybasic salt are used in a combination, on the basis of the weight of the flow pattern regulator used in the oil-based drilling fluid, the content of the polyurethane is 60-90 wt %, and the content of the polybasic acid or polybasic salt is 10-40 wt %. Preferably, the content of polyurethane is 75-85wt%, and the content of polybasic acid or polybasic salt is 15-25 wt %.

According to a preferred embodiment of the present invention, when amphiphilic block copolymer, polyurethane, and polybasic acid or polybasic salt are used in combination, on the basis of the weight of the flow pattern regulator used in the oil-based drilling fluid, the content of the amphiphilic block copolymer is 10-20 wt %, the content of the polyurethane is 60-70 wt % and the rest is polybasic acid or polybasic salt.

The composition provided by the present invention ay b obtained by evenly mixing the foregoing components.

The third aspect of the present invention provides an application of the foregoing composition in oil-based drilling fluid as well as an oil-based drilling fluid comprising the foregoing composition.

Preferably, the composition is used as a flow pattern regulator.

In order to obtain oil-based drilling fluid with better performance, when the density of the intended oil-based drilling fluid is 0.95-1.50 g/cm$^3$, the dosage of the flow pattern regulator is 0.4-1.5 g, preferably 0.5-1.0 g relative to 100 mL of oil-based drilling fluid base fluid; or when the density of the intended oil-based drilling fluid is above 1.50 g/cm$^3$, the dosage of the flow pattern regulator is from equal to or more than 0.1 g to less than 0.4 g relative to 100 mL of oil-based drilling fluid base fluid. According to an embodiment of the present invention, when the density of the intended oil-based drilling fluid is 0.95-1.5 g/cm$^3$, the dosage of the flow pattern regulator is 0.5-1.5 g, preferably 0.5-1 g (also typically expressed as 0.5-1%) relative to 100 mL of oil-based drilling fluid base fluid; or when the density of oil-based drilling fluid is above 1.50 g/cm$^3$, the dosage of the flow pattern regulator is less than 0.5 g (also typically expressed as 0.5%) preferably 0.1-0.4 g more preferably 0.2-0.4 g relative to 100 mL of oil-based drilling fluid base fluid.

Same as prior art, besides the foregoing composition as a flow pattern regulator, the oil-based drilling fluid also comprises an oil phase, brine, emulsifier, organic clay, calcium oxide, filtrate reducer and barite in general. The oil-based drilling fluid base fluid means the mixture of the oil phase and brine, wherein the volume of the oil phase accounts for 60%-95% in general and the volume of brine accounts for 5%-40% in general for the oil-based drilling fluid base fluid. Relative to 1.00 mL of base fluid, the dosage of emulsifier is 2-7 g, that of organic clay is equal to or more than 0.5 to less than 3 g, that of calcium oxide is 1-2.5 g, and that of filtrate reducer is 1-4 g. The dosage of barite is separately determined according to the design density of the oil-based drilling fluid system. Thus it can be seen, the content of organic clay is reduced significantly compared with conventional dosage of 2-6 g/100 mL in prior art.

The oil phase may be one or more selected from the group of diesel oil. mineral oil and synthetic oil. such as a-olefins and gas-to-liquid.

The emulsifier may be any type of emulsifier in prior art. For example, it may be the emulsifier disclosed in CN201410166050.7, or any type of commercial emulsifier produced by SINOPEC Research Institute of Petroleum Engineering, for example: SMEMUL-1 and SMEMUL-2 produced by SINOPEC Research Institute of Petroleum Engineering.

The filtrate reducer may be any type of filtrate reducer used in oil-based drilling fluid in prior art, including asphalt type filtrate reducer and/or modified humic acid type filtrate reducer, for example, oil-based drilling fluid filtrate reducer SMFLA-O produced by SINOPEC Research Institute of Petroleum Engineering.

The preferred density of the barite is 4.2-4.3 g/cm$^3$.

The organic clay may be any type of organic bentonite coin o y used in this field. The organic bentonite is a lipophilic-modified nonmetallic ore with montmorillonite as the primary mineral component, for example, quaternary ammonium salt modified organic bentonite. A specific product is organic clay SMOGEL-D produced by SINOPEC Research Institute of Petroleum Engineering for oil-based drilling fluid for example.

The brine may be calcium chloride aqueous solution, sodium formate aqueous solution or potassium formate aqueous solution, preferably calcium chloride aqueous solution. The concentration of aqueous solution is 10-40 wt % in general, preferably 20-30 wt %.

The oil-based drilling fluid provided by the present invention is obtained by evenly mixing the above components.

According to the fourth aspect of the present invention, the present invention provides a method for raising shearing force of oil-based drilling fluid. This method includes using the foregoing composition provided by the present invention as a flow pattern regulator. The use method has been described in the text above.

In the present invention, shearing force includes yield point and gel strength. The composition provided by the present invention obviously increases yield point and gel strength of oil-based drilling fluid.

Compared with conventional tackifier and shear strength-improving agent of oil-based drilling fluid, the present invention can raise structural force and shearing force and improve theological properties without significantly increasing the viscosity of drilling fluid even used in a little amount, and may be applied in diesel-based and mineral oil-based drilling fluids. Moreover, the flow pattern regulator of the present invention may reduce the dosage of organic clay and raise the tolerance of the drilling fluid system to low-density solid phase. Compared with products in prior art, the oil-based drilling fluid obtained by using the foregoing composition provided by the present invention as a flow pattern regulator obviously raises gel strength, yield point, ratio of yield point to plastic viscosity and other performances of the system before and after aging, and significantly enhances borehole cleaning and rock cutting and sand carrying capacity.

Below the present invention is further described by referring to embodiments. In the following examples and comparative examples, density of the oil-based drilling fluid at ambience temperature (25° C.), electric stability(or emulsion breaking voltage) (ES) of oil based-drilling fluid when heated up to 50° C., filter loss (FL) at ambience temperature (25° C.) and 690 KPa, as well as theological properties of oil based-drilling fluid when heated up to 50° C., including apparent viscosity (AV), plastic viscosity (PV), yield value (YP, or yield point), gel strength (including initial gel strength (IGS) and final gel strength (FGS) (readings at 10 s and 10 min after agitation at 600 rpm for 1 min, respectively)), are determined in reference to GB/T16783.2-2012, Petroleum and natural gas industries field testing of drilling fluids-Part 2: oil-based fluids.

The information of the block copolymer used in the following examples are detected and provided by the Canadian Polymer Source Inc. according to the method above.

In the following examples, amphiphilic block copolymer is produced by Canadian Polymer Source Inc.; polyurethane is purchased from Hong Kong J&T Co., Limited and made from reaction between polyethylene glycol and diisocyanate, and is anionic water-soluble polyurethane prepolymer emulsion; emulsifier is commercial products from SINOPEC Research Institute of Petroleum Engineering; organic clay is oil-based drilling fluid organic clay SMOGEL-D produced by SINOPEC Research Institute of Petroleum Engineering; filtrate reducer is oil-based drilling fluid filtrate reducer SMFLA-O produced by SINOPEC Research Institute of Petroleum Engineering; barite is produced by GuizhouKailiLongteng Mineral Co., Ltd., with density of not lower than 4.2 g/cm$^3$; the emulsifier is commercial SMEMUL-1 and/or SMEMUL-2 produced by SINOPEC Research Institute of Petroleum Engineering; acidic ionic compounds are all analytically pure commercial products purchased from Aladdin Reagents. Some of amphiphilic block copolymers and polyurethane are directly purchased from commercial products of the above company and some are custom-made by the above company.

Preparation Examples

These preparation examples are intended to prepare drilling fluid blank samples not comprising flow pattern regulator.

1# Oil-based Drilling Fluid Blank Sample:

320 mL of #0 diesel oil (Guangdong Maoming Petrochemical Co., Ltd., industrial product)+80 mL of 25 wt % CaCl$_2$ aqueous solution+16 g of primary emulsifier (commercial emulsifier SMEMUL-1 produced by SINOPEC Research Institute of Petroleum Engineering)+8 g of secondary emulsifier (commercial emulsifier SMEMUL-2 produced by SINOPEC Research Institute of Petroleum Engineering)+of CaO+12 g of organic clay+12 g of filtrate reducer, barite increasing density to 1.2 g/cm$^3$.

2# Oil-based Drilling Fluid Blank Sample:

340 ml, of #5 mineral oil (Guangdong Maoming Petrochemical Co., Ltd., industrial product)+60mL of 25 wt %

CaCl$_2$ aqueous solution+14 g of primary emulsifier (commercial emulsifier SMEMUL-1 produced by SINOPEC Research Institute of Petroleum Engineering)+8 g of secondary emulsifier (commercial emulsifier SMEMUL-2 produced by SINOPEC Research Institute of Petroleum Engineerina)+of CaO+10 g of organic clay+10 g of filtrate reducer, barite increasing density to 1.5 g/cm$^3$.

3#Oil-based Drilling Fluid Blank Sample:

340 mL of #0 diesel oil (Guangdong Maoming Petrochemical Co., Ltd., industrial product)+60 mL of 25 wt % CaCl$_2$ aqueous solution+18 g of primary emulsifier (commercial emulsifier SMEMUL-1 produced by SINOPEC Research Institute of Petroleum Engineering)+10 g of secondary emulsifier (commercial emulsifier SMEMUL-2 produced by SINOPEC Research Institute of Petroleum Engineerina)+8 g of CaO+10 g of organic clay+8 g of filtrate reducer, barite increasing density to 1.8 g/cm$^3$.

4# Oil-based Drilling Fluid Blank Sample:

340 mL of 40 diesel oil (Guangdong Maoming Petrochemical Co., Ltd., industrial product)+60 mL of 25 wt % CaCl$_2$ aqueous solution+18 g primary emulsifier commercial emulsifier SMEMUL-1 produced by SINOPEC Research Institute of Petroleum Engineering)+10 g of secondary emulsifier (commercial emulsifier SMEMUL-2 produced by SINOPEC Research Institute of Petroleum Engineering)+8 g of CaO+10 g of organic clay+8 g of filtrate reducer, barite increasing density to 1.0 g/cm$^3$.

5# Oil-based Drilling Fluid Blank Sample:

320mL of 40 diesel oil (Guangdong Maoming Petrochemical Co., Ltd., industrial product)+80 mL of 25 wt % CaCl$_2$ aqueous solution+16g primary emulsifier (commercial emulsifier SMEMUL-1 produced by SINOPEC Research Institute of Petroleum Engineering)+8 g of secondary emulsifier (commercial emulsifier SMEMUL-2 produced by SINOPEC Research Institute of Petroleum Engineering)+8 g of CaO+18g of organic clay+12 g of filtrate reducer, barite increasing density to 1.2 g/cm$^3$.

6# Oil-based Drilling Fluid Blank Sample:

340 mL of #5 mineral oil (Guangdong Maoming Petrochemical Co., Ltd., industrial product)+60 mL of 25 wt % CaCl$_2$ aqueous solution+14 g of primary emulsifier (commercial emulsifier SMEMUL-1 produced by SINOPEC Research Institute of Petroleum Engineering)+8g of secondary emulsifier (commercial emulsifier SMEMUL-2 produced by SINOPEC Research Institute of Petroleum Engineering)+8 g of CaO+15 g of organic clay+10 g of filtrate reducer, barite increasing density to 1.5 g/cm$^3$.

EXAMPLES 1-15

Flow pattern regulators and oil-based drilling fluids are prepared by mixing the components according to the proportions shown in Table 1, wherein I# polyurethane: anionic water-soluble polyurethane prepolymer emulsion, wherein solid content is 60 wt %, the number average molecular weight of prepolymer is about 7500, and molecular weight distribution index of molecular weight is 2.1.

II# polyurethane: anionic water-soluble polyurethane prepolymer emulsion, wherein solid content is 40 wt %, the number average molecular weight of prepolymer is about 6000, and molecular weight distribution index of molecular weight is 2.0.

III# polyurethane: anionic water-soluble polyurethane prepolymer emulsion, wherein solid content is 80 wt %, the number average molecular weight of prepolymer is about 5000, and molecular weight distribution index of molecular weight is 1.5.

The result on the properties of the oil-based drilling fluid is shown in Table 2.

COMPARATIVE EXAMPLES 1-3

Flow pattern regulators and oil-based drilling fluids are prepared according to the proportions shown in Table 1, wherein polyurethane is same as the foregoing examples.

The result on the properties of the oil-based drilling fluid is shown in Table 2.

TABLE 1

| Example No. | Amphiphilic block copolymer | Polyurethane | Acidic ionic compound | Oil-based drilling fluid blank sample | Drilling fluid density (g/cm$^3$) | Dosage (g/100 mL) |
|---|---|---|---|---|---|---|
| Example 1 | 40 wt % Polystyrene 40 Polyacrylamide 50 | — | 60 wt % Disodium adipate | 1# | 1.2 | 1.0 |
| Comparative Example 1 | — | — | — | 5# | 1.2 | 0 |
| Comparative Example 2 | 40 wt % Polystyrene 400 Polyacrylamide 400 | — | 60 wt % Disodium adipate | 1# | 1.2 | 1.0 |
| Example 2 | — | 90 wt % I# | 10 wt % Sebacic acid | 2# | 1.5 | 0.6 |
| Comparative Example 3 | — | — | — | 6# | 1.5 | 0 |
| Example 3 | — | 60 wt % II# | 40 wt % Octanedioic acid | 2# | 1.5 | 0.5 |
| Example 4 | 40 wt % Polyethylene glycol 60 Polymethyl acrylate 80 | 60 wt % III# | — | 3# | 1.8 | 0.2 |
| Example 5 | 24 wt % Polyethylene glycol 60 Polymethyl acrylate 90 | 76 wt % I# | — | 3# | 1.8 | 0.3 |
| Example 6 | 20 wt % Polyethylene glycol 60 Polymethyl acrylate 80 | 65 wt % II# | 15 wt % Adipic acid | 4# | 1.0 | 0.6 |
| Example 7 | 10 wt % Polyethylene glycol 70 Polymethyl acrylate 60 | 65 wt % III# | 25 wt % Glutaric acid | 4# | 1.0 | 0.8 |

TABLE 1-continued

| Example No. | Amphiphilic block copolymer | Polyurethane | Acidic ionic compound | Oil-based drilling fluid blank sample | Drilling fluid density (g/cm$^3$) | Dosage (g/100 mL) |
|---|---|---|---|---|---|---|
| Example 8 | 40 wt % Polystyrene 100 Polyacrylamide 100 | — | 60 wt % Disodium adipate | 1# | 1.2 | 1.0 |
| Example 9 | 40 wt %, brand P11216A-SEO Polystyrene 100 Polyethylene glycol 100 | — | 60 wt % Disodium adipate | 1# | 1.2 | 1.0 |
| Example 10 | 40 wt % Polymethyl acrylate 100 Polyacrylamide 100 | — | 60 wt % Disodium adipate | 1# | 1.2 | 1.0 |
| Example 11 | 30 wt % Polyethylene glycol 70 Polymethyl acrylate 60 | — | 70 wt % Glutaric acid | 4# | 1.0 | 0.8 |
| Example 12 | 30 wt % Polyethylene glycol 70 Polymethyl acrylate 60 | 70 wt % III# | — | 4# | 1.0 | 0.8 |
| Example 13 | | 70 wt % III# | 30 wt % Glutaric acid | 4# | 1.0 | 0.8 |
| Example 14 | 10 wt %, brand P764-EOSEO Polyethylene glycol 60 Polystyrene 180 Polyethylene glycol 60 | 65 wt % II# | 25 wt % Dipotassiumsebate | 1# | 1.2 | 0.8 |
| Example 15 | 20 wt %, brand P1374-SAAS Polystyrene 33 Polyacrylic acid 150 Polystyrene 33 | 60 wt % III# | 20 wt % Dipotassiumadipate | 4# | 1.0 | 0.6 |

TABLE 2

| Formula | Sample treatment | AV/ mPa·s | PV/ mPa·s | YP/ Pa | Ratio of yield point to plastic viscosity | ES/ V | FL/ mL | IGS G'(Pa)/ FGS G"(Pa) |
|---|---|---|---|---|---|---|---|---|
| 1# blank sample | Before aging | 19 | 15 | 4 | 0.27 | 550 | 0.4 | 4/5 |
| | 150° C./16 h | 22 | 17 | 5 | 0.29 | 519 | 0.6 | 4/5 |
| Example 1 | Before aging | 27 | 19 | 8 | 0.42 | 670 | 0.2 | 7/9 |
| | 150° C./16 h | 31 | 21 | 10 | 0.48 | 648 | 0 | 8/10 |
| Comparative Example 1 i.e.: 5# blank sample | Before aging | 22 | 17 | 5 | 0.29 | 520 | 0.4 | 5/6 |
| | 150° C./16 h | 25 | 19 | 6 | 0.31 | 508 | 0.4 | 5/6 |
| Comparative Example 2 | Before aging | 20 | 16 | 4 | 0.25 | 650 | 0.4 | 4/6 |
| | 150° C./16 h | 24 | 19 | 5 | 0.26 | 608 | 0.2 | 4/6 |
| 2# blank sample | Before aging | 30 | 24 | 6 | 0.25 | 685 | 0.2 | 6/8 |
| | 150° C./16 h | 36 | 28 | 8 | 0.28 | 590 | 0.4 | 6/9 |
| Example 2 | Before aging | 34 | 25 | 10 | 0.40 | 760 | 0 | 10/12 |
| | 150° C./16 h | 38 | 27 | 11 | 0.41 | 749 | 0.2 | 12/14 |
| Comparative Example 3 i.e.: 6# blank sample | Before aging | 34 | 26 | 8 | 0.31 | 670 | 0.4 | 7/10 |
| | 150° C./16 h | 37 | 28 | 9 | 0.32 | 548 | 0.2 | 8/10 |
| Example 3 | Before aging | 33 | 25 | 8 | 0.40 | 760 | 0 | 10/11 |
| | 150° C./16 h | 38 | 26 | 12 | 0.42 | 821 | 0.2 | 11/13 |
| 3# blank sample | Before aging | 37 | 31 | 6 | 0.19 | 579 | 0.2 | 10/14 |
| | 150° C./16 h | 39 | 32 | 7 | 0.21 | 489 | 0.2 | 12/15 |
| Example 4 | Before aging | 43 | 33 | 10 | 0.30 | 687 | 0 | 15/17 |
| | 150° C./16 h | 47 | 35 | 12 | 0.34 | 690 | 0 | 18/20 |
| Example 5 | Before aging | 47 | 35 | 12 | 0.34 | 682 | 0 | 16/18 |
| | 150° C./16 h | 51 | 37 | 14 | 0.34 | 723 | 0 | 19/20 |
| 4# blank sample | Before aging | 18 | 14 | 4 | 0.30 | 910 | 0.3 | 3/4 |
| | 150° C./16 h | 20 | 16 | 4 | 0.25 | 858 | 0.4 | 3/4 |
| Example 6 | Before aging | 22 | 16 | 6 | 0.38 | 1070 | 0.2 | 6/8 |
| | 150° C./16 h | 26 | 19 | 7 | 0.37 | 987 | 0 | 7/9 |
| Example 7 | Before aging | 24 | 17 | 7 | 0.41 | 1135 | 0.2 | 7/8 |
| | 150° C./16 h | 28 | 19 | 9 | 0.47 | 1022 | 0 | 8/10 |
| Example 8 | Before aging | 30 | 20 | 10 | 0.50 | 980 | 0.2 | 9/11 |
| | 150° C./16 h | 35 | 23 | 12 | 0.52 | 858 | 0 | 10/12 |
| Example 9 | Before aging | 29 | 20 | 9 | 0.45 | 876 | 0.2 | 8/10 |
| | 150° C./16 h | 33 | 23 | 10 | 0.43 | 756 | 0 | 8/10 |

TABLE 2-continued

| Formula | Sample treatment | AV/ mPa·s | PV/ mPa·s | YP/ Pa | Ratio of yield point to plastic viscosity | ES/ V | FL/ mL | IGS G'(Pa)/ FGS G"(Pa) |
|---|---|---|---|---|---|---|---|---|
| Example 10 | Before aging | 28 | 20 | 8 | 0.40 | 847 | 0.4 | 8/10 |
| | 150° C./16 h | 32 | 22 | 10 | 0.45 | 784 | 0.6 | 9/10 |
| Example 11 | Before aging | 22 | 16 | 6 | 0.38 | 1087 | 0.2 | 6/8 |
| | 150° C./16 h | 26 | 18 | 8 | 0.44 | 956 | 0 | 7/9 |
| Example 12 | Before aging | 21 | 16 | 5 | 0.31 | 984 | 0.2 | 5/7 |
| | 150° C./16 h | 24 | 17 | 7 | 0.41 | 907 | 0 | 6/8 |
| Example 13 | Before aging | 19 | 14 | 5 | 0.36 | 874 | 0.2 | 5/6 |
| | 150° C./16 h | 22 | 17 | 5 | 0.29 | 822 | 0 | 6/7 |
| Example 14 | Before aging | 28 | 19 | 9 | 0.47 | 660 | 0 | 8/9 |
| | 150° C./16 h | 33 | 23 | 10 | 0.43 | 682 | 0 | 8/10 |
| Example 15 | Before aging | 25 | 18 | 7 | 0.39 | 1190 | 0 | 6/7 |
| | 150° C./16 h | 29 | 20 | 9 | 0.45 | 1087 | 0 | 7/8 |

The data comparison between Comparative Example 1 and Example 1, and between Comparative Example 3 and Example 2 indicates that when other components of oil-based drilling fluid are same, the viscosity is too high and the ratio of yield point to plastic viscosity is significantly low if no flow pattern regulator but only extra organic clay system is added to oil-based drilling fluid systems. The data in Table 2 indicates that the flow pattern regulator provided by the present invention is particularly applicable to diesel-based and mineral oil-based drilling fluid, and even a little amount of the flow pattern regulator is added to a system, ratio of yield point to plastic viscosity may be maintained at 0.3-0.5, and heat resistance for additives is above 150° C., and it is applicable to drilling fluid with density up to 1.8g/cm³.

What is claimed is:

1. An oil-based drilling fluid comprising a composition comprising at least two selected from the group of amphiphilic block copolymer, polyurethane and acidic ionic compound, wherein the amphiphilic block copolymer having at least one of the structures shown in the following structural formulae (1), (2) and (3):

$$A_m\text{-}B_n \quad (1)$$

$$B'_{n'}\text{-}A'_{m'}\text{-}B''_{n''} \quad (2)$$

$$A''_{m''}\text{-}B'''_{n'''}\text{-}A'''_{m'''} \quad (3)$$

wherein each of A, A', A" and A''' denotes a hydrophilic repeat unit, each of B, B', B" and B''' denotes a hydrophobic repeat unit, and m, n, m', n', m", n", m''' and n''' are numbers of repeat units and in a range of 10-200;

wherein the acidic ionic compound comprising two or more than two acid radical anions, and at least two acid radical anions are at the two ends of the acidic ionic compound respectively; and wherein on the basis of the total amount of the composition, the content of the amphiphilic block copolymer is 10-50 wt %, and the content of polyurethane is 50-90 wt %; or the content of the amphiphilic block copolymer is 10-50 wt %, and the content of acidic ionic compound is 50-90 wt %; or the content of the polyurethane is 55-95 wt %, and the content of acidic ionic compound is 5-45 wt %; or the content of the amphiphilic block copolymer is 5-25 wt %, the content of the polyurethane is 55-75 wt %, the content of acidic ionic compound is 10-25 wt %.

2. The oil-based drilling fluid according to claim 1, wherein on the basis of the total amount of the composition, the content of the amphiphilic block copolymer is 20-40 wt %, and the content of polyurethane is 60-80 wt %; or the content of the amphiphilic block copolymer is 20-40 wt %, and the content of acidic ionic compound is 60-80 wt %; or the content of the polyurethane is 60-90 wt %, and the content of acidic ionic compound is 10-40 wt %; or the content of the amphiphilic block copolymer is 10-20 wt %, the content of the polyurethane is 60-70 wt %, the content of acidic ionic compound is 10-20 wt %.

3. The oil-based drilling fluid according to claim 1, wherein each of A, A', A" and A''' in the amphiphilic block, copolymer is one or more of the following Formula (A-1), Formula (A-2) and Formula (A-3);

Formula (A-1)

Formula (A-2)

Formula (A-3)

wherein each of $R_1$, $R_2$, $R_3$, $R_4$, $R_5$ and $R_6$ is independently H or C1-C5 alkyh;

each of B, B', B" and B''' is one or more of the following Formula (B-1), Formula (B-2) and Formula (B-3);

Formula (B-1)

-continued

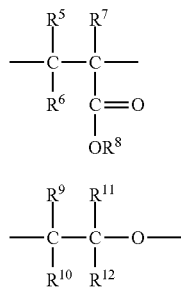
Formula (B-2)

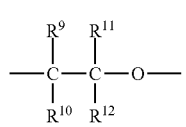
Formula (B-3)

wherein each of $R^1$, $R^2$, $R^3$, $R^4$, $R^5$, $R^6$, $R^7$, $R^9$, $R^{10}$, $R^{11}$ and $R^{12}$ is H or C1-C10 hydrocarbonyl, and at least one of $R^9$, $R^{10}$, $R^{11}$ and $R^{12}$ is not H, and $R^8$ is C1-C10 hydrocarhonyl; each of m, n, m', n', m", n", m'" and n '" is in a range of 20-160.

4. The oil-based drilling fluid according to claim 3, wherein each of $R^1$, $R^2$, $R^3$, $R^4$, $R^5$, $R^6$, $R^7$, $R^9$, $R^{10}$, $R^{11}$ and $R^{12}$ is H, methyl, ethyl, propyl, vinyl, allyl, propenyl, phenyl or tolyl, and at least one of $R^9$, $R^{10}$, $R^{11}$ and $R^{12}$ is not H, and $R^8$ is methyl, ethyl, propyl, vinyl, allyl, propenyl, phenyl or tolyl.

5. The oil-based drilling fluid according to claim 3, wherein any of $R^1$, $R^2$, $R^3$, $R^4$, $R^9$, $R^{10}$, $R^{11}$ and $R^{12}$ is methyl, ethyl, propyl, vinyl, allyl, propenyl, phenyl or tolyl and each of the rest is H or methyl, each of $R^5$, $R^6$ and $R^7$ is independently H, methyl or ethyl, and $R^8$ is methyl or ethyl.

6. The oil-based drilling fluid according to claim 1, wherein in the amphiphilic block copolymer, each of A, A', A" and A'" is at least one of acrylic acid structural unit, methacrylic acid structural unit, acrylamide structural unit, methacrylamide structural unit and ethylene oxide structural unit; each of B, B', B" and B'" is at least one of ethylenestructural units, propylenestructural units, butylenestructural units, butadienestmctural units, styrene structural units, acrylic ester structural units and methacrylic ester structural units; each of m, n, m', n', m", n", m'" and n'" is in a range of 20-160.

7. The oil-based drilling fluid according to claim 1, wherein the amphiphilic block copolymer is one or more of polyacrylamide-polystyrene 2-block copolymer, polyethylene glycol-polystyrene 2-block copolymer, polymethacrylamide-polystyrene 2-block copolymer, polyethylene glycol-poly ethyl acrylate 2-block copolymer, polyethylene glycol-polymethyl methacrylate 2-block copolymer, polyethylene glycol-polyethyl acrylate 2-block copolymer, polyethylene glycol-polyethyl methacrylate 2-block copolymer, polyacrylamide-polystyrene-polyacrylamide 3-block copolymer, polymethacrylamide-polystyrene-polymethacrylamide 3-block copolymer, polyethylene glycol-polystyrene-polyethylene glycol 3-block copolymer, polyethylene glycol-polymethyl acrylate-polyethylene glycol 3-block copolymer, polyethylene glycol-polymethyl methacrylate-polyethylene glycol 3-block copolymer, polyethylene glycol-polyethyl acrylate-polyethylene glycol 3-block copolymer, polyethylene glycol-polyethyl methacrylate-polyethylene glycol 3-block copolymer, polystyrene-polyacrylic acid-polystyrene 3-block copolymer, polystyrene-polyacrylamide-polystyrene 3-block copolymer, polystyrene-polymethacryiamide-poiystyrene 3-block copolymer, polymethyl acrylate-polyethylene glycol-polymethyl acrylate 3-block copolymer, polymethyl methacrylate-polyethylene glycol-polymethyl methacrylate 3-block copolymer, polyethyl acrylate-polyethylene glycol-polyethyl acrylate 3-block copolymer and polyethyl, methacrylate-polyethylene glycol-polyethyl methacrylate 3-block copolymer.

8. The oil-based drilling fluid according to claim 1, wherein the polyurethane is obtained from reaction between diol and diisocyanate, and the number average molecular weight is in a range of 5000-100000.

9. The oil-based drilling fluid according to claim 8, wherein the polyurethane has a structure shown in Formula (I):

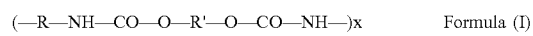
(—R—NH—CO—O—R'—O—CO—NH—)x     Formula (I)

wherein R and R' are linear, branched or cyclic aliphatic alkylidene, with 1-6 carbon atoms.

10. The oil-based drilling fluid according to claim 1, wherein the number of carbon atoms in the acidic ionic compound is 2-20, and the acid radical anions are one or more of carboxylate radical anion, sulfonate radical anion and aminosulfonate radical anion.

11. The oil-based drilling fluid according to claim 10, wherein the acidic ionic compound is polybasic carboxylic acid with a structure shown in Formula (II) or its alkali metal or alkaline-earth metal salts:

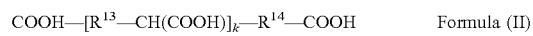
COOH—[$R^{13}$—CH(COOH)]$_k$—$R^{14}$—COOH     Formula (II)

$R^{13}$ and $R^{14}$ are both linear aliphatic alkylidene, the number of carbon atoms is in a range of 3-18, and k is in a range of 0-2.

12. The oil-based drilling fluid according to claim 1, wherein the acidic ionic compound is one or more of glutaric acid, adipic acid, disodium adipate, sebacic acid, disodium sebate, dipotassiumsebate, dodecanedioic acid, sodium dodecanedioate, hexadecanedioic acid, sodium hexadecanedioate, octanedioic acid, sodium octanedioate and potassium octanedioate.

13. The oil-based drilling fluid according to claim 7, wherein the acidic ionic compound is one or more of glutaric acid, adipic acid, disodium adipate, sebacic acid, disodium senate, dipotassiumsebate, dodecanedioic acid, sodium dodecanedioate, hexadecanedioic acid, sodium hexadecanedinate, octanedioic acid, sodium octanedioate and potassium octanedioate.

14. The oil-based drilling fluid according to claim 1, wherein the composition is used as a flow pattern regulator.

15. The oil-based drilling, fluid according to claim 14, wherein when the density of oil-based drilling fluid is 0.95-1.50 g/cm³, the dosage of the flow pattern regulator is 0.5-1.5 g/100 mL; or when the density of oil-based drilling fluid is above 1.50 g/cm³, the dosage of the flow pattern regulator is below 0.5 g/100 mL.

16. A method for raising shearing force of oil-based drilling fluid, including using the composition according to claim 1 as a flow pattern regulator of oil-based drilling fluid.

17. The method according to claim 16, wherein when the density of oil-based drilling fluid is 0.95-1.50 g/cm³, the dosage of the flow pattern regulator is 0.5-1.5 g/100 mL; or when the density of oil-based drilling fluid is above 1.5 g/cm³, the dosage of the flow pattern regulator is below 0.5 g/100 mL.

\* \* \* \* \*